UNITED STATES PATENT OFFICE.

BENJAMIN G. LAMME AND WILFRED SYKES, OF PITTSBURGH, PENNSYLVANIA, ASSIGNORS TO WESTINGHOUSE ELECTRIC AND MANUFACTURING COMPANY, A CORPORATION OF PENNSYLVANIA.

SPEED CONTROL FOR INDUCTION-MOTORS.

1,333,664.  Specification of Letters Patent.  Patented Mar. 16, 1920.

Application filed October 21, 1916. Serial No. 126,906.

*To all whom it may concern:*

Be it known that we, BENJAMIN G. LAMME, a citizen of the United States, and a resident of Pittsburgh, in the county of Allegheny and State of Pennsylvania, and WILFRED SYKES, a subject of the King of Great Britain, and a resident of Pittsburgh, in the county of Allegheny and State of Pennsylvania, have invented a new and useful Improvement in Speed Control for Induction-Motors, of which the following is a specification.

Our invention relates to systems of control for induction motors, and it has for its object to provide a system that shall be capable of application to induction motors of the largest sizes and which shall be flexible and economical in operation and substantially free from surging and allied harmful phenomena.

Figure 1:
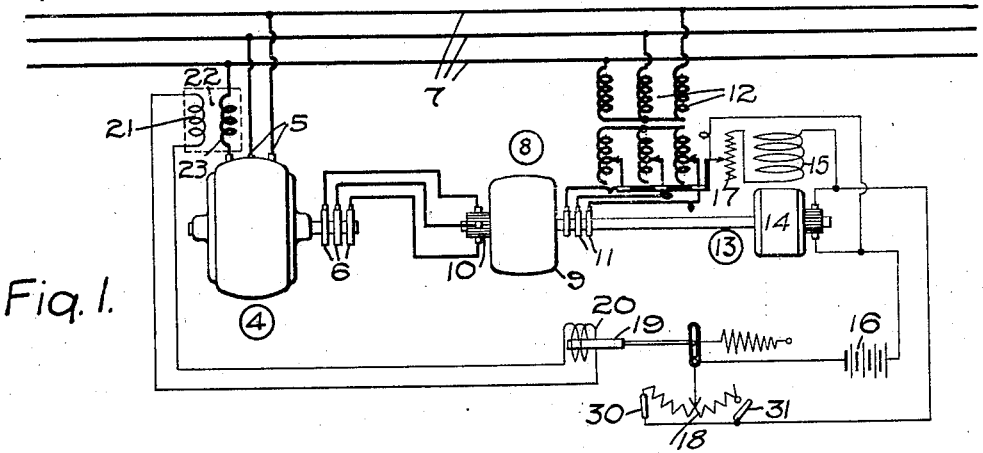
Figure 2:
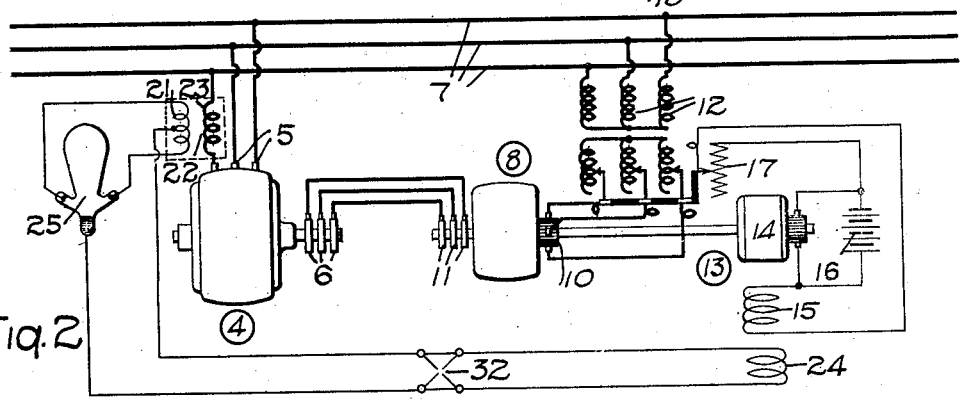
Figure 3:
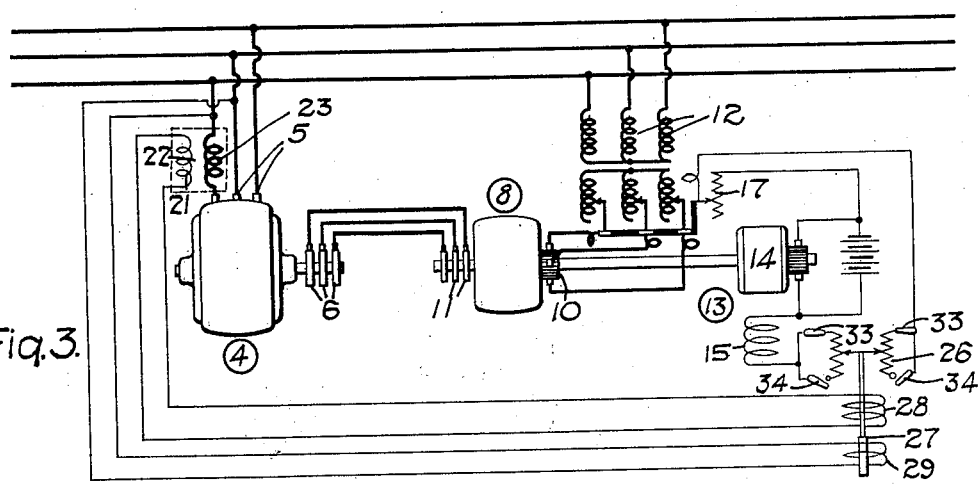

In the accompanying drawing, Figure 1 is a diagrammatic view of an induction motor, together with its attendant supply and control circuits, constructed in accordance with a preferred form of our invention; and Figs. 2 and 3 are diagrammatic views of modifications of the system shown in Fig. 1.

An old and well-known method of varying the speed of a large-capacity induction motor is to connect a frequency-changer and adjustable transformers between the secondary winding thereof and the source. Energy derived from the secondary winding during under-synchronous operation is suitably changed in frequency in the frequency-converter and in voltage in the transformer for return to the system. Similarly, energy derived from the system has been appropriately changed in voltage in the transformer and in frequency in the frequency-converter for introduction into the secondary of the main induction motor for over-synchronous operation.

The frequency-changer of the prior systems has either been self-propelled or has been driven by a separate motor. By variations in the speed of said frequency-changer, the desired alterations in the ratio of frequency conversion therein have been obtained.

In a copending application of B. G. Lamme, Serial No. 583, filed Jan. 5, 1915, and assigned to the Westinghouse Electric & Manufacturing Company, is disclosed a system of the character indicated and the necessity is shown, for stable under-synchronous operation, of having the frequency imposed upon the secondary of the main induction motor of the frequency-changer fall off with an increase of load upon the main induction motor by substantially the same percentage that the speed of the main induction motor would be reduced because of resistance slip under like load conditions. In other words, there is pointed out the desirability of having the load-speed characteristic of the driving means for the frequency-changer approximate in shape the load-speed characteristic of the main induction motor when operating with a suitable amount of resistance in the secondary winding thereof under like conditions of load. Similarly, for over-synchronous operation, the speed of the driving motor should be increased with a load increase in the main motor.

There are disclosed in said aforementioned application two distinct methods of obtaining the desired speed adjustment of the frequency converter. One of these comprises driving the frequency-converter by an alternating-current motor of the commutator type, adjusting the field voltage of said motor in accordance with the load on the main induction motor through a current transformer in order to obtain the desired speed adjustment thereof. The other method of speed control is to place a mechanical brake of the electrically operated type upon the shaft of the frequency-converter and to energize said brake in accordance with the load on the main induction motor. The normal load on the motor driving the frequency-changer constituting solely the iron, copper, friction and windage losses in the two auxiliary machines, it is apparent that a brake of relatively small dimensions will suffice to produce the desired speed reduction in the frequency-converter.

By the present invention, we provide a system that is generally similar to the first of the aforementioned systems but we employ a driving motor of the direct-current type for the frequency-changer because of the facility and wide range of speed control of the direct-current motor, and we associate with said driving motor appropriate speed-regulating means responsive to change in load on the main induction motor for producing the desired speed control.

Referring to the drawing for a more detailed understanding of our invention, we show a main induction motor at 4, said motor being provided with stator terminals 5—5 and with rotor terminals 6—6 in the form of the usual slip rings. Energy for the operation of the motor 4 is derived from a suitable polyphase supply system 7 directly connected to the stator terminals 5. The motor 4 is mechanically coupled to any suitable load, such, for example, as a rolling mill, by gearing or shafting (not shown).

The frequency-changer for the speed control of the motor 4 is shown at 8 and comprises a stator 9 and a rotor member or armature provided with a commutator 10 and with slip rings 11. The machine 8 may assume a variety of forms, provided it be adapted to perform the functions of a frequency-changer and may, for example, be constructed in accordance with the disclosure of U. S. Patent No. 682,942, issued to the Westinghouse Electric & Manufacturing Company on Sept. 17, 1901, upon an application filed by B. G. Lamme. Briefly speaking, a frequency converter of the character designated comprises essentially an armature the winding of which is connected both to the segments of the commutator and to appropriate slip rings. Said armature is driven at a speed corresponding to the difference in frequency between the input and the output frequencies, as is well-known in the art. If said frequency changer is not of the self-propelled type, the stator thereof may be unprovided with field windings or, in fact, the stator may be done away with entirely and an iron keeper or armature may rotate with the main armature to perform the function of the stator in closing the magnetic circuit.

The slip rings 6 of the main induction motor 4 are connected to the commutator 10 of the machine 8 and the slip rings 11 of the machine 8 are connected to the system 7 through adjustable transformers 12—12.

The frequency-changer 8 is driven by a direct-current motor 13 comprising an armature 14 and a field winding 15. The motor 13 is driven from a suitable source 16. The current in the field winding 15 is adjusted by a variable resistor 17 mechanically coupled or otherwise arranged to be adjusted simultaneously with the transformers 12—12. The current supplied to the armature 14, through a switch 30, is subject to control by an adjustable resistor 18 which, in turn, is under the control of the core 19 of a solenoid 20 receiving energy from the secondary winding 21 of a current transformer 22, the primary winding 23 of which is inserted in one of the main supply leads of the motor 4.

Having thus described the arrangement of a system embodying our invention, the operation is as follows: the motor 4 is started in any desired manner and brought up to the desired fraction of synchronous speed. The motor 13 is energized and adjusted in speed by variation in the resistor 17 until the frequency-changer is properly operating to convert the energy derived from the secondary member of the induction motor 4 at slip frequency to the frequency of the supply system. The mechanical connection between the resistor 17 and the transformers 12 is such that, when the movable contact member of the resistor 17 occupies the proper position, the transformers 12—12 are also properly adjusted in transformation ratio to convert the current supplied to the slip rings 11 to the voltage of the system 7.

While, for simplicity, we have shown simple moving taps in the resistor 17 and in the transformers 12—12, we, preferably, in commercial operation, employ electrically or pneumatically operated switches for performing these functions, said switches being mechanically or electrically interlocked for simultaneous operation in order to obtain the desired effects. The specific details of the switches and interlocking systems employed form no part of the present invention and it is, therefore, deemed unnecessary to give the same more than passing mention.

The automatic reduction in the speed of the frequency-converter 8 with a load increase on the main motor 4 is obtained as follows. The load increase produces an increase in the current flowing through the primary winding 23 of the transformer 22, increasing the energization of the solenoid 20 and drawing the core member 19 to the left. This moves the contact member of the resistor 18 toward the right, inserting additional resistance in series with the armature 14, thus lowering the speed of the motor 13 and of the frequency-converter 8.

For over-synchronous operation, it is desirable that the speed of the frequency changer be slightly increased upon an increase in the main motor load. For this purpose, an increased energization of the solenoid 20 should decrease rather than increase the resistance in the armature circuit of the motor 13. During over-synchronous operation, therefore, the switch 30 is opened, and connection is made to the resistor 18 through a switch 31 so that movement of the contact member toward the right decreases rather than increases the effective armature-control resistance.

Referring to the form of our invention shown in Fig. 2, the main essentials of the system are as heretofore shown and described and like parts are similarly designated. The automatic speed reduction of the motor 13, upon an increase in the load of the main motor 4, is obtained, however, as follows: the driving motor 13 is provided with an auxiliary exciting field winding 24 in addition to the usual field winding 15, and said field winding 24 is energized from the secondary winding 21 of the transformer 22 through a vapor converter 25 or other equivalent rectifying device. The field windings 15 and 24 are wound to assist each other. With these connections, an increase in load on the motor 4 increases the current supplied by the converter 25 to the field winding 24 and increases the total field strength of the motor 13, producing a decrease in the speed thereof, as is desired.

For over-synchronous operation, a reversing switch 32 is thrown to the dotted position, so that the winding 24 "bucks" or opposes the winding 15. Under these conditions, an increase in the main motor load increases the excitation and neutralizing action of the winding 24, producing a decrease in the net or resultant field of the motor 13 and a resultant speed increase therein, as is desirable.

The system of Fig. 3 shows still another method whereby the driving motor 13 may be reduced in speed upon an increase in the main induction load by the adjustment of the field excitation thereof. The exciting circuit of the field winding 15 includes not only the adjustable resistor 17 which varies with the setting of the transformers 12—12 but it also includes an adjustable resistor 26 which is subject to the control of a wattmeter element 27 comprising a current coil 28 deriving energy from the secondary member 21 of the transformer 22 and a voltage coil 29 connected between two of the supply leads of the main induction motor. A change in the load current flowing to the motor 4 affects the wattmeter element 27 to change the setting of the resistor 26, producing the appropriate change in the excitation of the field 15, and, consequently, in the speed of the driving motor 13 and of the main induction motor 8.

The use of the wattmeter element 27, comprising both current and voltage elements, causes the speed control of the frequency converter 8 to be subject solely to the watt current flowing to the main induction motor as, in systems having poor power factor, serious mal-adjustments might occur because of excessive wattless current flowing through the motor 24.

For over-synchronous operation, the switches 33—33 are opened and connection is made to the resistor 26 through switches 34—34 so that increased energization of the wattmeter element 27 increases rather than decreases the resistance in series with the field winding 15, thus weakening the field and increasing the speed of the motor 13.

While we have shown our invention in a plurality of forms, it will be obvious to those skilled in the art that it is susceptible of various minor changes and modifications without departing from the spirit thereof and we desire, therefore, that only such limitations shall be placed thereupon as are imposed by the prior art or as are set forth in the appended claims.

We claim as our invention:

1. The combination with a main induction motor, of a frequency-changer connected to control the secondary frequency thereof, a direct-current motor for driving said frequency-changer at under-synchronous speed during under-synchronous operation of said main motor and for driving said frequency-changer at over-synchronous speed during over-synchronous operation of said main motor, and means whereby the speed of said driving motor is automatically altered inversely with the load of said main motor during under-synchronous operation and whereby the speed of said driving motor is automatically varied directly with the load of said main motor during over-synchronous operation.

2. The combination with a main induction motor, of a frequency changer operatively associated therewith for aiding in the speed control thereof, a direct-current motor for driving said frequency changer, a source of energy supply for said driving motor, and means whereby the field excitation of said driving motor is automatically increased upon a load increase of the main motor during under-synchronous operation.

3. The combination with a main induction motor, of a frequency changer operatively associated therewith for aiding in the speed control thereof, a direct-current motor for driving said frequency changer, a source of energy supply for said driving motor, and means whereby the field excitation of said driving motor is automatically decreased upon an increase of the main motor load during over-synchronous operation.

4. The combination with a main induction motor, of a frequency changer operatively associated therewith for aiding in the speed control thereof, a direct-current motor for driving said frequency-changer, a source of energy supply for said driving motor, and means whereby the field excitation of said driving motor is automatically increased upon a load increase of the main motor during under-synchronous operation and whereby the field excitation of said driving motor is automatically decreased upon an increase of the main motor load during over-synchronous operation.

5. The combination with a main induction motor, of a frequency changer operatively associated therewith for aiding in the speed control thereof, a direct-current motor for driving said frequency changer, a source of energy supply for said driving motor, and electro-responsive means subject to the control of the load of the main motor and operative to increase the field excitation of said driving motor upon an increase in the main motor load during under-synchronous operation and vice versa.

6. The combination with a main induction motor, of a frequency changer operatively associated therewith for aiding in the speed control thereof, a direct-current motor for driving said frequency changer, a source of energy supply for said driving motor, and electro-responsive means subject to the control of the main motor load and operative to decrease the field excitation of said driving motor upon an increase in the main motor load during over-synchronous operation and vice versa.

7. The combination with a main induction motor, of a frequency changer operatively associated therewith for aiding in the speed control thereof, a direct-current motor for driving said frequency changer, a source of energy supply for said driving motor, and electro-responsive means subject to the control of the load of the main motor and operative to increase the field excitation of said driving motor upon an increase in the main motor load during under-synchronous operation and vice versa, and operative to decrease the field excitation of said driving motor upon an increase in the main motor load during over-synchronous operation and vice versa.

In testimony whereof we have hereunto subscribed our names this 19th day of October, 1916.

BENJ. G. LAMME.
WILFRED SYKES.